May 2, 1950 R. F. WILD 2,506,531
ELECTRIC MOTOR CONTROL APPARATUS
Filed Aug. 30, 1947 4 Sheets-Sheet 1

INVENTOR.
RUDOLF F. WILD
BY Arthur H. Swanson
ATTORNEY

May 2, 1950 R. F. WILD 2,506,531
ELECTRIC MOTOR CONTROL APPARATUS
Filed Aug. 30, 1947 4 Sheets-Sheet 2

*INVENTOR.*
RUDOLF F. WILD
BY
*ATTORNEY*

INVENTOR.
RUDOLF F. WILD
BY Arthur H. Swanson
ATTORNEY

May 2, 1950 R. F. WILD 2,506,531
ELECTRIC MOTOR CONTROL APPARATUS
Filed Aug. 30, 1947 4 Sheets-Sheet 4

*INVENTOR.*
RUDOLF F. WILD
BY Arthur H. Swanson
ATTORNEY

Patented May 2, 1950

2,506,531

UNITED STATES PATENT OFFICE 2,506,531

ELECTRIC MOTOR CONTROL APPARATUS

Rudolf F. Wild, Philadelphia, Pa., assignor, by mesne assignments, to Minneapolis-Honeywell Regulator Company, Minneapolis, Minn., a corporation of Delaware Application August 30, 1947, Serial No. 771,531

13 Claims. (Cl. 318—28)

The present invention relates to apparatus for measuring and/or recording the magnitude and changes in magnitude of a variable condition, and particularly to self-balancing apparatus for measuring and/or recording the magnitude and changes in magnitude of a minute direct electrical potential or current. More specifically, the present invention relates to improvements in apparatus of this type which endow the apparatus with a high degree of stability and provide great freedom from drift and from the effects of other disturbing influences encountered in the measurement of minute direct electrical potentials and currents.

A general object of the present invention is to provide self-balancing measuring and/or recording apparatus especially adapted to measure with great accuracy and with great consistency minute direct electrical potentials and currents, and including means for automatically compensating for the disturbing effects of varying external factors on the accuracy of the measurements obtained.

A specific object of the invention is to provide measuring and/or recording apparatus of the type referred to above which has the desirable characteristics of high stability and great freedom from drift and from the effects of other disturbing influences.

A more specific object of the invention is to provide, in self-balancing measuring and/or recording apparatus of the type including electronic amplifying means, improved means for maintaining a high degree of stability and consistency in the apparatus, and for effecting suitable compensation for varying conditions of operation which would otherwise introduce measurement errors.

A further specific object of the present invention is to provide, in self-balancing measuring and/or recording apparatus of the type including electronic amplifying means and mechanical vibrating means for changing the minute direct electrical potentials or currents being measured into alternating current signals, improved means for effecting compensation for variations in the operating characteristics of the mechanical vibrating means.

A still further specific object of the invention is to provide in apparatus of the type last referred to improved means for rendering changes in the contacting time of the mechanical vibrating means ineffective to introduce errors into the measurements made by the apparatus.

In the measurement of extremely minute direct electrical currents and voltages, it has been found expedient in many instances to amplify by electronic means the current or voltage being measured in order to produce a signal of sufficient magnitude to operate a suitable exhibiting device. Experience has shown that the so-called direct coupled amplifiers heretofore used for amplifying very small direct current or voltages are usually highly unstable, having the undesirable characteristics of excessive drift, varying gain, and undesirable sensitivity to the disturbing effects of varying external factors on the accuracy with which amplification is effected. Often such direct current amplifiers are provided with various devices for effecting compensation for the effects of the different undesirable varying factors involved, but at best such devices are unsuitable in many applications involving the measurement of extremely minute direct currents or voltages.

It has been proposed in the prior art in connection with the measurement and electronic amplification of direct currents or voltages to change the direct current or voltage being measured into an alternating current signal before amplification, and to amplify this resulting alternating current signal by means of a conventional electronic alternating current amplifier. Such a procedure permits measurements to be made with a high degree of accuracy, since alternating current amplifiers are not characterized by instability and susceptibility to the effects of varying conditions as are direct current amplifiers.

One of the most satisfactory and practical arrangements for changing a small direct current into an alternating current signal for the purpose just described is the so-called mechanical vibrator or vibrating reed converter, which is well known to those skilled in the art and hence requires little further description at present. Such converters are usually driven by magnetic means which is associated with the vibrating reed and which is energized with alternating current for the purpose of maintaining the reed in continuous vibration at the frequency of the alternating energizing current.

Although the vibrating reed converter is extremely suitable for the conversion of small direct potentials or currents, its use for converting extremely minute direct potentials, such as those generated by a thermocouple exposed to infra-red radiation in connection with infrared spectroscopy, has been limited. This limitation has resulted from the introduction by the converter of stray electrical signals into the apparatus, the magnitude of which signals approaches and often exceeds the magnitude of the minute potential being converted. This condition necessarily introduces serious measuring errors, and definitely limits the lowest magnitude of the direct potential which can be measured with a desired degree of acuracy.

In the present invention, the introduction of stray signals into the apparatus by the vibrating reed input converter is prevented by operating the magnetic energizing means of the converter with an energizing current the magnitude of which is a fraction of that ordinarily employed in the operation of the converter for the conversion of direct potentials of comparatively greater magnitude. However, with such reduced energization, the output voltage of the converter tends to be unstable, being affected by changes in magnitude and frequency of the converter energizing voltage and by changes in the ambient temperature, etc.

To overcome the errors which such instability of output voltage would normally produce, a second or output vibrating reed converter is connected to the output of the amplifying apparatus in such a manner as to rectify the alternating current signal output of the amplifier and thereby produce a direct current signal which is proportional to the minute direct potential being measured. This output converter is advantageously identical in basic construction to the input converter and is energized with alternating current of normal magnitude which is supplied from the same source as that which supplies the energizing current of lower magnitude to the input converter. The output converter is characterized, however, in a manner to be described, by its ability to compensate for the output voltage instability of the input converter. To this end, the contacts of the output converter are so adjusted as to effectively short-circuit the output of the amplifying apparatus during predetermined periods of time in which the variations in contacting time of the input converter would otherwise introduce measuring errors. This results in a stable output voltage from the apparatus regardless of contact time variations and instability of output voltage of the input converter. The measurement of extremely minute direct currents or potentials with a high degree of accuracy and consistency is thus made possible.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
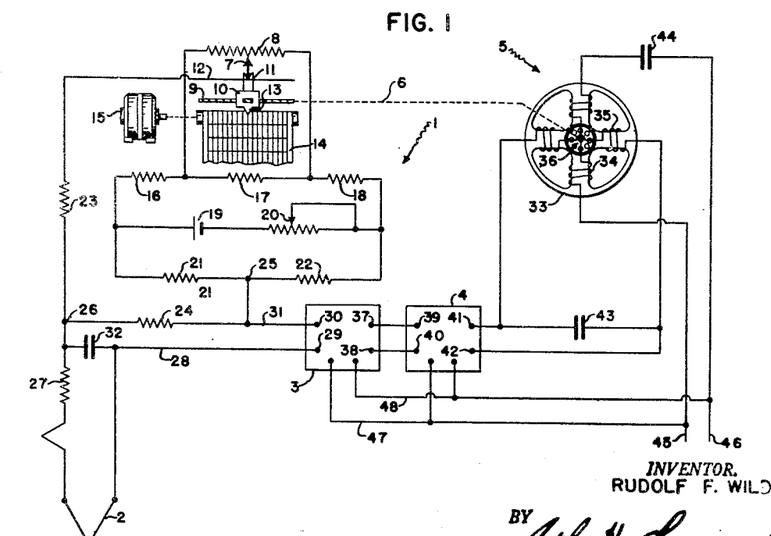
Fig. 1 is a circuit diagram which illustrates a preferred embodiment of the present invention in connection with self-balancing measuring and recording apparatus of a well-known type.

In Fig. 1 of the drawings, there is illustrated self-balancing potentiometric measuring and recording apparatus of a type well adapted to embody the principles of the present invention. The self-balancing potentiometric apparatus illustrated is of the type disclosed and claimed in U. S. Patent 2,423,540, granted to Walter P. Wills on July 8, 1947, and disclosed in U. S. Patent 2,398,341, granted to Walter P. Wills on April 9, 1946.

The system of Fig. 1 comprises a potentiometric measuring circuit generally designated at 1 which is operative to measure the output voltage or E. M. F. of a thermocouple 2. The output of the potentiometric circuit 1 is connected to the input of a preamplifier section 3, the output of which is connected to an amplifier and motor drive section 4. The output of the latter section is connected to a two phase reversible induction motor 5, the shaft of which is mechanically coupled by means of a suitable linkage 6 to a sliding contact 7 of a slidewire resistance 8, located in the circuit 1. More specifically, the linkage 6 is operatively connected to a threaded shaft 9 on which rides a pen carriage 10, the carriage 10 being in threaded engagement with the shaft 9 and moveable laterally thereby. The carriage 10 is provided with an extension 11 which carries the contact 7 in sliding engagement with the slidewire resistance 8. The contact 7 is also in sliding engagement with a collector bar 12 which serves as an electrical connection to the contact 7.

A pen 13, carried by the carriage 10, is in contact with a record sheet or chart 14, and is arranged to make a record thereon in the usual manner. The chart 14 is advanced relative to the pen 13 by suitable feed means, including an electric chart driving motor 15. The apparatus just described is so proportioned and arranged that operation of the motor 5 in one direction causes the pen carriage 10 and contact 7 to move to the left in Fig. 1, whereas operation of the motor 5 in the opposite direction causes the carriage 10 and contact 7 to move to the right. The pen 13 and chart 14 cooperate in the usual manner to produce a permanent record of the positions and movements of the carriage 10 and contact 7.

The potentiometric measuring circuit 1 includes, in addition to the slidewire resistance 8, a first branch including resistors 16, 17 and 18, connected together in series. The resistance 8 is connected in parallel with the resistor 17, one end of the resistance 8 being connected to the junction between the resistors 16 and 17, and the other end of the resistance 8 being connected to the junction between the resistors 17 and 18.

Also included in the circuit 1 is an energizing branch connected in parallel with the first branch and including a battery 19 and a battery rheostat 20 connected together in series. A third branch, connected in parallel with the first branch and with the energizing branch, includes series connected resistors 21 and 22. Attenuating resistors 23 and 24 are connected in series between the collector bar 12 and a terminal 25, the latter being the junction between the resistors 21 and 22.

The junction between the resistors 23 and 24 forms a terminal 26, the terminals 25 and 26 being the output terminals of the potentiometric circuit 1.

The attenuating resistors 23 and 24 serve to adapt the range of output voltage of the potentiometric circuit 1 so that this voltage range will match the output E. M. F. range of the thermocouple 2 for the particular range over which the latter is to measure temperature. Thus, for example, if the thermocouple 2 is to measure infrared radiation, its output E. M. F. range may be in the neighborhood of 0–1 microvolt. It is not usually practical, however, to construct a standard potentiometric circuit having such a low output voltage range. Consequently, in the above example, a potentiometric circuit having an output voltage range of 0–1 millivolt between the collector bar 12 and the terminal 25 can be used, the values of the resistors 23 and 24 being chosen so as to provide a 1000:1 attenuation of the potentiometric output voltage so that the latter will match the thermocouple output E. M. F. By way of illustration, the values of the resistors 23 and 24 to provide such attenuation may well be 9990 ohms and 10 ohms, respectively.

The thermocouple 2 is connected in series with the output of the circuit 1 to the input of the preamplifier 3. To this end, one lead of the thermocouple 2 is connected through a damping and filtering resistance 27 to the terminal 26 and the other thermocouple lead is connected by a conductor 28 to one of the input terminals 29 of the preamplifier 3. The other preamplifier input terminal 30 is connected by a conductor 31 to the terminal 25. A damping and filtering condenser 32 is connected in parallel with the series connected resistor 27 and thermocouple 2.

In a manner described in detail in the first mentioned Wills patent, and well known to those skilled in the art, the apparatus just described is capable of producing between the preamplifier terminals 29 and 30 a direct voltage having a magnitude which is always equal to the algebraic sum of the potentiometric output voltage, appearing between the terminals 25 and 26, and the thermocouple output E. M. F., and being of one polarity or of opposite polarity depending upon whether the thermocouple E. M. F. is greater than or less than the potentiometric output voltage.

The two-phase reversible induction motor 5 is of conventional construction, comprising a magnetic structure 33 on two opposite poles of which is wound a power winding 34. A control winding 35 is wound on two other opposite poles of the structure 33 in such a position as to be in space quadrature with the winding 34. The motor 5 also includes a squirrel cage rotor 36, to which is connected the aforementioned linkage 6.

Output terminals 37 and 38 of the preamplifier 3 are connected, respectively, to input terminals 39 and 40 of the amplifier and motor drive circuit 4. Output terminals 41 and 42 of the latter circuit are connected, respectively, to the end terminals of the motor control winding 35. A condenser 43 is connected in parallel with the winding 35 for a purpose to be described hereinafter.

The motor power winding 34 is connected in series with a condenser 44 between supply conductors 45 and 46, the latter serving to supply to the apparatus of Fig. 1 alternating energizing voltage of commercial frequency, assumed herein to be 60 cycles per second, from a suitable source, not shown. The condenser 44 serves a purpose to be described hereinafter. The preamplifier 3 and the amplifier and motor drive circuit 4 are also supplied with energizing voltage from the supply conductors 45 and 46 through branch conductors 47 and 48, which are connected to the conductors 45 and 46, respectively.

The apparatus just described is so designed and constructed that when the voltage between the preamplifier input terminals 29 and 30 is zero, that is, when the potentiometric circuit output voltage between the terminals 25 and 26 is equal in magnitude and opposite in polarity to the output E. M. F. of the thermocouple 2, no voltage will appear between the preamplifier output terminals 37 and 38 or between the amplifier and motor drive circuit input terminals 39 and 40. Under this condition, a voltage will appear between the output terminals 41 and 42 and across the motor control winding 35 of such nature as to cause a braking force to be applied to the motor rotor 36 which will act to prevent any rotation of the latter. This in turn will prevent any movement of the slidewire contact 7 or any change in the voltage between the terminals 25 and 26. When in this condition, the system including the thermocouple 2 and the potentiometric circuit 1 is said to be balanced, and the pen 13 and chart 14 will cooperate to produce a record of the instantaneous temperature of the thermocouple 2, which temperature is responsible for the particular output voltage of the latter producing the balanced condition of the system.

Upon an increase in the temperature of the thermocouple 2 above the value prevailing for the balanced condition just described, the thermocouple output E. M. F. will increase, and will no longer equal the potentiometric output voltage. Consequently, the system will be unbalanced and a resultant voltage will be applied between the input terminals 29 and 30 of the preamplifier 3. The latter is so arranged that the voltage applied to the input terminals 29 and 30 thereof will be converted into an alternating voltage and will be amplified, rectified, and filtered within the preamplifier 3. Hence, a D. C. output voltage will appear between the preamplifier output terminals 37 and 38 which is an amplified reproduction of the voltage applied to the input terminals 29 and 30.

The preamplifier output voltage will be applied between the input terminals 39 and 40 of the amplifier and motor drive circuit 4, wherein the voltage will again be converted to an alternating voltage which will be amplified and used to produce an output voltage between the terminals 41 and 42 which will in turn be operative to energize the control winding 35 of the motor 5 for operation of the rotor 36 in a direction to drive the slidewire contact 7 up scale, or to the right in Fig. 1, to increase thereby the potentiometric output voltage between the terminals 25 and 26 until the latter voltage is once more equal and opposite to the thermocouple E. M. F. When the contact 7 has thus moved to the right, the input voltage to the preamplifier 3 will again be zero, the system will once more be balanced, and the rotor 36 will be prevented from rotating further.

Upon a decrease in the temperature of the thermocouple 2, the converse of what has just been described takes place. That is, a voltage will be applied to the preamplifier input which will produce a voltage across the motor control winding 35 which in turn will cause operation of the motor rotor 36 in a direction to drive the slidewire contact 7 down scale, or to the left in Fig. 1, to decrease thereby the potentiometric output voltage until the latter is equal and opposite to the new lower thermocouple E. M. F. When the contact 7 has thus moved to the left, the input voltage to the preamplifier 3 will again be zero, the system will once more be balanced, and the rotor 36 will be prevented from rotating further. At all times, the pen 13 and chart 14 cooperate to provide a record of the instantaneous values of temperature of the thermocouple 2.

A detailed description of the manner in which the potentiometric circuit 1, the amplifier and motor drive circuit 4, and the motor 5 cooperate to produce the actions just described will be found in the first mentioned Wills patent. Since the preamplifier 3 forms the basis for the present invention, a detailed description of the latter follows, but only a brief description of the remainder of the apparatus of Fig. 1 is included herein since this last mentioned apparatus forms no part of the present invention and is not specifically claimed herein.

Figure 2:
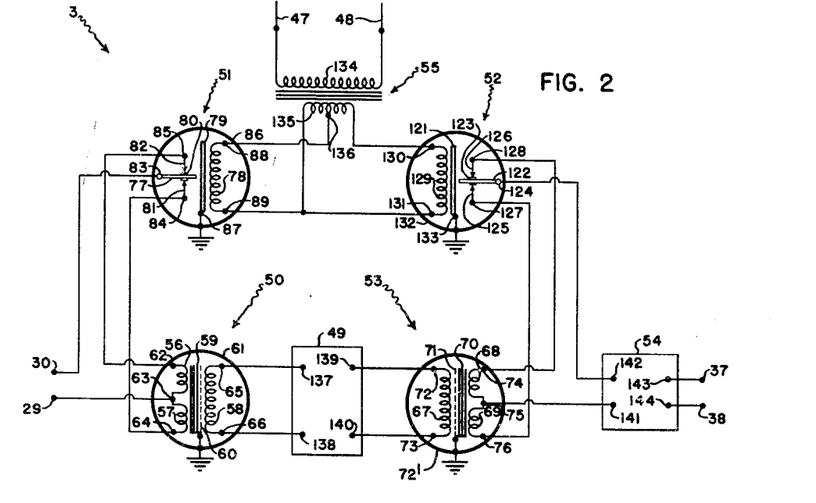
Fig. 2 is a circuit diagram which illustrates in detail a portion of the apparatus of Fig. 1.

The circuit of the preamplifier 3 of Fig. 1 is shown in some detail in Fig. 2. In the latter figure, the preamplifier 3 is shown as comprising an amplifier section designated at 49, an input transformer 50, an input converter 51, an output converter 52, an output transformer 53, a filter designated at 54, and a line voltage step-down transformer 55.

The input transformer 50 is a voltage step-up transformer comprising a relatively low impedance split primary winding, having winding sections 56 and 57, and a relatively high impedance secondary winding 58. These windings are wound on a suitable transformer core 59, and an electrostatic shield 60 is interposed between the primary and secondary windings. The core 59 and shield 60 are connected to ground in the conventional manner. The transformer 50 is completely enclosed within a metallic shield can 61, which is also connected to ground.

One end of the primary winding section 56 is connected to a terminal 62, and the other end of this winding section is connected to a terminal 63. One end of the primary winding section 57 is also connected to the terminal 63, and the other end of the latter section is connected to a terminal 64. The two ends of the secondary winding 58 are connected to terminals 65 and 66, respectively.

The output transformer 53 is shown as being identical to the input transformer 50 but connected and utilized as a voltage step-down transformer. To this end, the transformer 53 comprises a relatively high impedance primary winding 67, a relatively low impedance split secondary winding having winding sections 68 and 69, a core 70, an electrostatic shield 71, and an enclosing shield can 72'. The core 70 and the shields 71 and 72' are connected to ground.

One end of the primary winding 67 is connected to a terminal 72, and the other end of the winding 67 is connected to a terminal 73. One end of the secondary winding section 68 is connected to a terminal 74, and the other end of the latter section is connected to a terminal 75. One end of the winding section 69 is also connected to the terminal 75, and the other end of the last mentioned section is connected to a terminal 76.

The input converter 51 is of the mechanical interrupter, vibrating reed type, and is shown as being of the type disclosed and claimed in U. S. Patent 2,423,524, granted to Frederick W. Side on July 8, 1947. The converter 51 comprises a reed 77 which is maintained in continuous vibration by an alternating current energized electromagnetic coil 78 cooperating with a permanent polarizing magnet 79. The reed 77 carries a contact 80 which alternately engages stationary contacts 81 and 82 as the reed 77 vibrates between the two latter contacts under the influence of the coil 78 and magnet 79. The reed 77 is electrically connected to a terminal 83, the reed 77 serving as a conductor for the contact 80. The contact 81 is connected to a terminal 84, and the contact 82 is connected to a terminal 85. The converter mechanism just described is enclosed in a metallic shield can 86 which is connected to a grounded terminal 87 as is the magnet 79. The ends of the coil 78 are connected to terminals 88 and 89, respectively.

Figure 3:
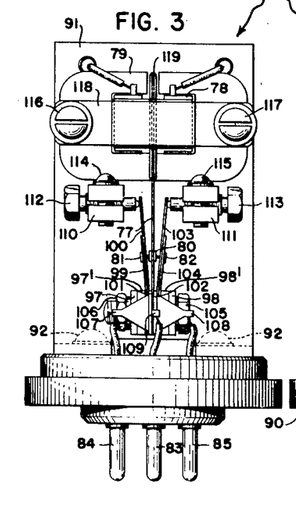
Figs. 3 and 4 are drawings which illustrate in detail one of the converters shown diagrammatically in Fig. 2.
Figure 4:
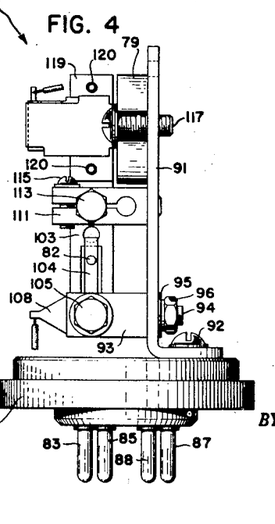

The converter 51 is shown in greater detail in Figs. 3 and 4, wherein it can be seen that the converter is provided with a base 90 formed of an electrically insulating material in which are mounted the terminals 83, 84, 85, 87, 88 and 89. A supporting plate 91 is screwed to the base 90 by means of screws 92. A stud 93, provided with a screw-threaded extension 94, is secured to the lower end of the plate 91 by means of a lock washer 95 and a nut 96. The free end of the stud 93 is bifurcated, having spaced-apart ends 97 and 98. Located between the spaced ends 97 and 98 are an insulating spacer 97', a spring contact arm 99 carrying the contact 81, a resilient stop 100, an insulating spacer 101, the vibrating reed 77 carrying the contact 80, an insulating spacer 102, a resilient stop 103, a spring contact arm 104 carrying the contact 82, and an insulating spacer 98'. These elements are all clamped between the spaced-apart ends 97 and 98 by a bolt 105 and a nut 106. The spring contact arms 99 and 104 are provided with ears 107 and 108, respectively, which are electrically connected to the terminals 84 and 85, respectively. The vibrating reed 77 is provided with an ear 109 which is electrically connected to the terminal 83. Riveted to the supporting plate 91 are studs 110 and 111 which carry adjustable stops in the form of screws 112 and 113 formed of insulating material. When the adjustable stops 112 and 113 have been adjusted as desired, they are clamped in place by means of screws 114 and 115, respectively. The spring contact arm 104 carrying the contact 82 through its own resiliency engages the resilient stop 103, and the resilient stop 103 through its own resiliency engages the adjustable stop 113. In like manner the spring contact arm 99 engages the resilient stop 100 which in turn engages the adjustable stop 112. By adjusting the adjustable stops 112 and 113, the positions of the contacts 81 and 82 may be independently adjusted with respect to the contact 80 carried by the vibrating reed 77.

The permanent magnet 79 is secured to the supporting plate 91 by screws 116 and 117. The coil 78 is held in place by a bracket 118 which in turn is secured in place by the screws 116 and 117. The end of the vibrating reed 77 is disposed within the coil 78 and is provided with an armature 119 which is riveted to the vibrating reed 77 by rivets 120 as shown in Fig. 4.

As previously mentioned, the coil 78 is energized with alternating current and acts on the armature 119 to vibrate the reed 77 at the frequency of the alternating current supplied to the coil 78, herein assumed to be 60 cycles per second, to cause the contact 80 to engage and disengage with the contacts 81 and 82 at the same frequency. The permanent magnet 79 operates in conjunction with the coil 78 and the armature 119 in such a manner as to cause the armature 119 to vibrate in synchronism with the alternating current supplied to the coil 78. By adjusting the adjustable stops 112 and 113 and hence the contacts 81 and 82, the wave form of the pulsating current produced by the operation of the contacts 80, 81 and 82 may be adjusted to a desired shape. The contacts are preferably so arranged that when the contact 80 is in its stationary position it engages both of the contacts 81 and 82. This provides an overlapping action which permits a high degree of stability to be maintained in the apparatus. Further, this overlapping contact action compensates for wear of the contacts and also contributes to the elimination of stray electrical effects on the operation of the apparatus. Due to this overlapping action also, wear of the contacts does not materially alter the wave form produced by the contacts. By mounting the contacts 81 and 82 on the spring arms 99 and 104, respectively, good wiping contact is at all times provided between contact 80 and the contacts 81 and 82. An electrical connection is provided between one of the screws 92 and the grounded terminal 87 so that the various parts of the converter are connected to ground to maintain the converter at ground potential. The shield can 86 is held in place on the base 90 by means of a rolled flange clamping the cover to the base, and is grounded by a suitable connection to the terminal 87.

The converter 51 is essentially a polarized switching mechanism, operated at a frequency of 60 cycles per second in synchronism with the 60 cycle energizing voltage supplied to the coil 78. For purposes of explanation, it may be assumed that the contact 81 engages the contact 80 during the first half cycle of the alternating voltage when the latter is positive, and that the second contact 82 engages the contact 80 during the second half cycle when the alternating voltage is negative. Accordingly, the contacts 80 and 81 engage when the voltage of the alternating supply voltage is positive, and the contacts 80 and 82 engage when the supply voltage is negative. When the vibrating reed 77 is stationary in its mid-position, both of the contacts 81 and 82 will be engaged by the contact 80, so that when the vibrating reed is operated, the contact 80 is always in engagement with one or the other of the contacts 81 and 82.

The output converter 52 is shown in Fig. 2 as being identical to the input converter 51, the converter 52 comprising a permanent magnet 121, a reed 122 carrying a contact 123 and connected to a terminal 124, stationary contacts 125 and 126 connected to terminals 127 and 128, respectively, a coil 129 connected between terminals 130 and 131, and a shield can 132, connected to a grounded terminal 133, as is the magnet 121. The adjustment of the contacts 125 and 126 relative to the contact 123 differs from the adjustment of the contacts of the input converter 51 in an important manner to be described in detail hereinafter.

The transformer 55 comprises a line voltage primary winding 134, which is connected between and energized from the branch supply conductors 47 and 48, and a low voltage secondary winding 135, which is center-tapped at 136. The center-tap 136 is connected to the coil terminal 88 of the input converter 51, and the other coil terminal 89 of the latter is connected to one end terminal of the winding 135. The coil terminals 130 and 131 of the output converter 52 are connected, respectively, to the opposite ends of the winding 135. Thus, the input converter coil 78 is energized with an alternating voltage from the transformer 55 having a magnitude which is substantially lower than that of the alternating energizing voltage applied to the output converter coil 129. This is done for a purpose to be described in detail hereinafter.

In the preamplifier 3 of Fig. 2, the input terminal 29 is connected to the terminal 63 of the input transformer 50. The terminals 62 and 64 of the latter are connected, respectively, to the terminals 85 and 84 of the input converter 51. The terminal 83 of the latter is connected to the input terminal 30. The input circuit to the preamplifier 3 can therefore be traced from the input terminal 29 to the common terminal 63 of the input transformer primary winding sections 56 and 57, and through the latter and the associated input converter contacts 80, 81 and 82 to the other input terminal 30. When the converter 51 is in operation, the primary winding sections 56 and 57 are alternately connected between the input terminals 29 and 30.

The input transformer terminal 65 is connected to an input terminal 137 of the amplifier 49, and a second input terminal 138 of the latter is connected to the terminal 66. Thus the input transformer secondary winding 58 is connected to the input of the amplifier 49. The latter also has output terminals 139 and 140 which are connected, respectively, to the output transformer terminals 72 and 73. Thus the output transformer primary winding 67 is connected to the output of the amplifier 49.

The common terminal 75 of the output transformer secondary winding sections 68 and 69 is connected to an input terminal 141 of the filter circuit 54. A second input terminal 142 of the latter is connected to the output converter terminal 124. The output converter terminals 127 and 128 are connected, respectively, to the output transformer terminals 76 and 74. Thus a circuit can be traced from the filter terminal 141 through the output transformer secondary winding sections 68 and 69 and through the output converter contacts 125, 126 and 123 to the other filter terminal 142. When the converter 52 is in operation, the secondary winding sections 68 and 69 are alternately connected between the filter input terminals 141 and 142. The filter 54 also has output terminals 143 and 144 which are connected, respectively, to the preamplifier output terminals 37 and 38.

In the operation of the apparatus of Fig. 2, the direct voltage applied between the terminals 29 and 30 from the measuring circuit when the system is unbalanced is changed into an alternating voltage by the conjoint action of the input converter 51 and input transformer 50. This alternating voltage or signal appears between the secondary winding terminals 65 and 66, having a magnitude proportional to the magnitude of the direct unbalance voltage, having a frequency equal to the supply voltage frequency, and being of one phase or of opposite phase depending on the polarity of the direct unbalance voltage and hence on the direction of the system unbalance.

The alternating voltage or signal appearing between the terminals 65 and 66 is fed into the amplifier 49, wherein this signal is amplified in the conventional manner. The amplified signal appears between the amplifier output terminals 139 and 140, having a magnitude proportional to, but substantially greater than, the input signal applied between the amplifier input terminals 137 and 138.

The output signal of the amplifier 49 is applied to the primary winding 67 of the output transformer 53, and by the conjoint action of the latter and the output converter 52, a pulsating direct voltage is produced between the filter input terminals 141 and 142, which voltage, after passing through the filter 54 and being filtered therein, appears between the filter output terminals 143 and 144 and between the preamplifier output terminals 37 and 38 as a direct voltage with a magnitude which is proportional to, but substantially greater than, the direct voltage between the terminals 29 and 30, and with a polarity which is the same as that of the last mentioned voltage.

As was hereinbefore noted, the input converter coil 78 is energized with alternating voltage having a magnitude which is substantially lower than that of the voltage employed to energize the output converter coil 129. Specifically, the coil 78 is energized with a voltage which is approximately one-half that which would normally be used to energize this coil if the converter 51 were employed to convert signals having much higher magnitudes. By way of illustration, but not by way of limitation, it may be noted that a converter coil-energizing voltage of six volts is suitable for use with a converter of the type illustrated herein when the converter is employed to convert signals having magnitudes in the neighborhood of one millivolt. However, a converter coil-energizing voltage of three volts maximum has been found suitable for use with an identical converter when the latter is employed to convert signals having magnitudes in the neighborhood of one microvolt. The phenomenon producing the need for such a lowered converter coil-energizing voltage will now be explained.

In the operation of a converter of the type illustrated herein, an alternating magnetic field is set up in the vicinity of the operating coil due to the alternating current flowing therein. This magnetic field interacts with the contacting mechanism of the converter to produce therein a stray alternating current signal of a magnitude which is a direct function of the magnitude of the coil energizing voltage. When the converter is employed to convert signal potentials of the order of one millivolt and higher, normal shielding procedures are sufficient to prevent the above described stray signal produced by normal coil-energizing voltage from affecting to any appreciable extent the signal being converted. However, when the signal potentials being converted are very minute, of the order of one microvolt, no practically providable shielding is sufficient to prevent the stray signal produced by normal coil-energizing voltage from affecting to a prohibitive degree the signal being converted. The only practical way known to me to prevent the stray signal produced by the energizing coil from affecting the signal being converted is to reduce the coil energizing voltage to a value such that the introduced stray signal will be of so small a magnitude as to have a negligible effect on the minute signal being converted.

I have found, however, that when a converter of the type illustrated herein is operated with a lowered coil energizing voltage as explained above, the output of the converter is very unstable, and the magnitude of the converted voltage varies a prohibitive amount as a result of supply voltage fluctuations and the effects of other transient conditions which cause variations in the contacting time of the converter contacts. This instability results in the introduction of serious measuring errors. It is to be noted, however, that these fluctuations and transient conditions affect only to a negligible extent a converter which is energized at normal voltage.

I have discovered that the instability produced by a converter operating with reduced energizing voltage in a measuring system such as that illustrated in Figs. 1 and 2 can be completely compensated for by suitable contact timing adjustments of the input and output converters. In the past, it has been common practice to adjust the contact timing of the input and output converters to be identical, but such adjustment does not effect compensation for the instability produced by the low voltage energized input converter.

Figure 5:
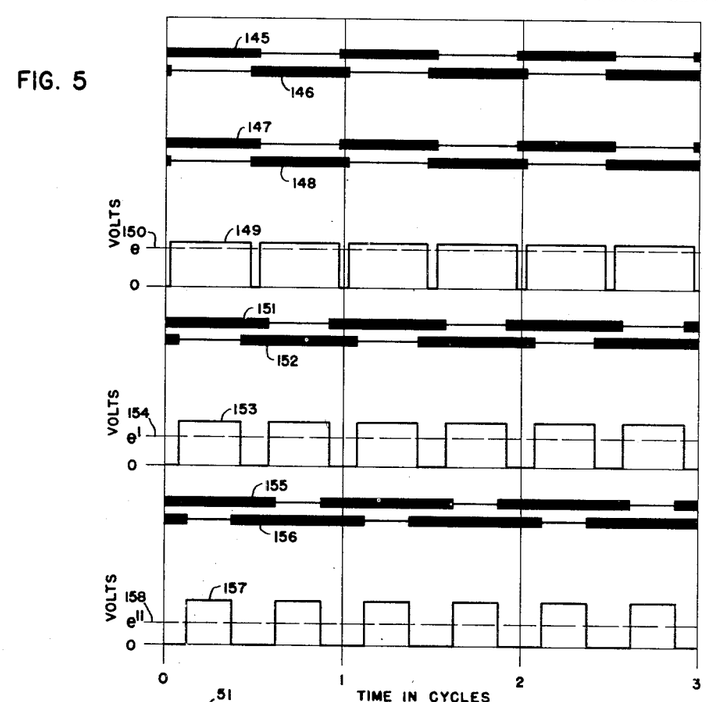
Figs. 5 and 6 are curves which illustrate the manner of operation of the apparatus of Fig. 1.

In Fig. 5 there is shown a group of typical curves which graphically illustrate the undesirable effects produced in a measuring system, such as the one illustrated in Figs. 1 and 2, by a converter, such as the input converter 51, when the latter is operated at reduced energizing voltage and when the contact timing of the input and output converters is initially adjusted to be identical.

The curve 145 of Fig. 5 is an operational curve showing contact position vs. time for the output converter contacts 123 and 125. The heavy line portions of the curve 145 represent the periods during which the contacts 123 and 125 are in engagement, and the light line portions of the curve represent the periods during which the contacts 123 and 125 are not in engagement.

The curve 146 is an operational curve for the contacts 123 and 126, the heavy line curve portions representing periods during which the contacts 123 and 126 are in engagement, and the light line portions representing periods during which the contacts 123 and 126 are not in engagement. The periods of contact overlap for the output converter 52 are those during which both of the curves 145 and 146 are shown as heavy lines.

The curves 147 and 148 are operational curves for the input converter 51, corresponding to the respective curves 145 and 146 for the output converter 52. The curve 147 is for the contacts 80 and 81, and the curve 148 is for the contacts 80 and 82. The heavy line curve portions represent periods during which the particular contacts are in engagement, and the light line portions represent periods during which the particular contacts are disengaged. This applies also to the remainder of the operational curves illustrated in Fig. 5 and to be described shortly.

The curves 147 and 148 refer to the operation of the input converter when the contact timing of the latter coincides with that of the output converter. Thus the curve 147 is identical to the curve 145, and the curve 148 is identical to the curve 146. The periods of contact overlap for the converter 51 are those during which both of the curves 147 and 148 are shown as heavy lines.

The curve 149 of Fig. 5 is a typical curve of voltage vs. time, the voltage being that appearing between the filter input terminals 141 and 142 for a given constant input voltage E applied between the preamplifier input terminals 29 and 30 when the input converter 51 is operating according to the curves 147 and 148 and the output converter 52 is operating according to the curves 145 and 146. From the curve 149 it can be seen that the output voltage applied to the filter 54 is a maximum during periods when neither converter exhibits contact overlap as previously defined, and that the output voltage is zero when either of the converters exhibits contact overlap. The curve 150 is a curve of average voltage vs. time, the voltage being the average of the pulsating direct voltage shown by the curve 149, and being that produced between the preamplifier output terminals 37 and 38. The voltage represented by the curve 150 is the D. C. component of the voltage of the curve 149, the latter having its A. C. component removed by the action of the filter 54. From the curve 150 is can be seen that for converter operation according to the curves 145, 146, 147 and 148, the voltage output of the filter 54 appearing between the preamplifier output terminals 37 and 38 will have a value equal to $e$.

The operational curves 151 and 152 correspond to the respective curves 147 and 148, being for the input converter contacts 80 and 81, and 80 and 82, respectively. However, the curves 151 and 152 represent operation of the input converter 51 for a different contact timing than that represented by the curves 147 and 148. As previously explained, such a change in contact timing may be caused by a supply voltage fluctuation or other transient condition, and may result, as shown, in an increase in contact overlap. The operation of the output converter 52 is assumed to remain constant, which assumption, as previously mentioned, is in agreement with observed data.

The curve 153 corresponds to the curve 149, but shows the filter input voltage produced by the same preamplifier input voltage E when the input converter 51 operates according to the curves 151 and 152 with increased contact overlap. Such operation produces a pulsating voltage having longer zero periods which in turn yields an average voltage, as shown by the output voltage curve 154, having a value of $e'$, which is seen to be smaller than the output voltage $e$ of the curve 150.

The operational curves 155 and 156 correspond to the respective curves 151 and 152, but represent operation of the input converter 51 with a further increase in contact overlap. The curve 157 corresponds to the curves 149 and 153 but shows the filter input voltage produced by the same preamplifier input voltage E when the input converter 51 operates according to the curves 155 and 156 with further increased contact overlap and with correspondingly longer zero voltage periods. The curve 158, corresponding to the curves 150 and 154, shows the preamplifier output voltage corresponding to the pulsating voltage of the curve 157 and having a value of $e''$, which is seen to be smaller than either of the output voltages $e$ or $e'$.

From the foregoing, it is evident that variations in the contact timing and resulting contact overlap of the input converter 51 produce variations in the output voltage of the preamplifier 3, when the contact timings of the converters 51 and 52 are initially adjusted to be identical. These voltage variations, represented by the differences between the output voltages $e$, $e'$ and $e''$ for a constant input voltage E, cause the introduction of measuring errors into the system of which the preamplifier 3 is a part, and hence are highly undesirable.

I have discovered, however, that if the output converter contacts are so adjusted that the contact overlap of the output converter embraces all possible positions of the contact overlap of the input converter, subsequent variations in the contact timing of the input converter, as a result of supply voltage fluctuations and other transient conditions, and the resulting instability of the input converter output voltage, will be compensated for, and will not cause the introduction of errors into the measurements made with the apparatus.

More specifically, I have found that in order to compensate for the instability of contact timing of the input converter 51, the contacts of the output converter 52 must be adjusted so that the contact 123 will be in engagement with both of the contacts 125 and 126 simultaneously during all of the periods when the input converter contact 80 can possibly be in simultaneous engagement with both of the contacts 81 and 82, although these last mentioned periods may vary in length and position in the converter operating cyle. Such adjustment is accomplished by making the output converter contact overlap periods, during which the output converter contact 123 engages both of the contacts 125 and 126 simultaneously, sufficiently long to completely embrace the input converter contact overlap periods of varying length and varying position, during which the input converter contact 80 engages both of the contacts 81 and 82 simultaneously.

Figure 6:
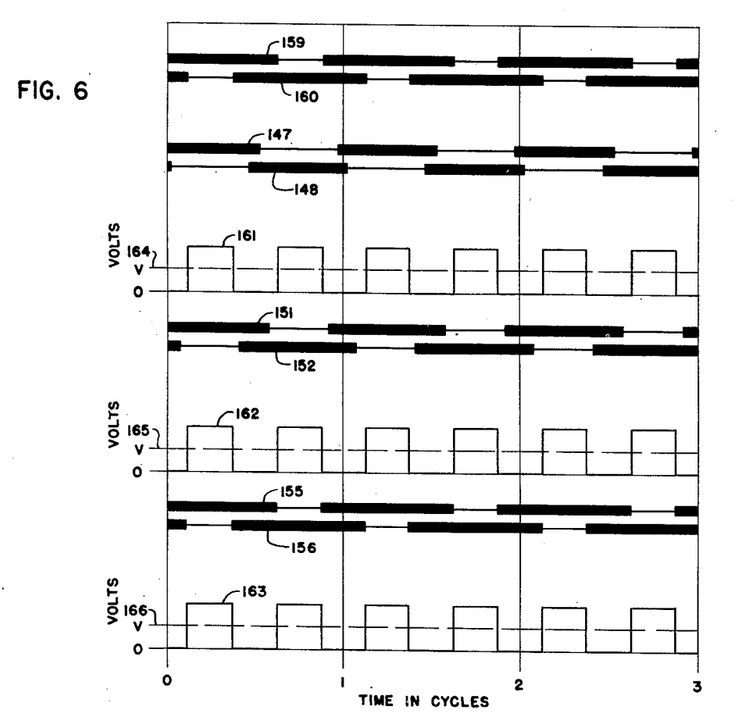

In Fig. 6 there is illustrated a group of curves which are similar to the curves of Fig. 5, but which are typical of the operation of the preamplifier 3 when the output converter 52 is adjusted in the preferred manner just described. The curves 147, 148, 151, 152, 155 and 156 of Fig. 5 are reproduced in Fig. 6, being the operational curves for the input converter 51 and representing variations in the contact timing and the contact overlap of the latter. The operational curves 159 and 160 of Fig. 6 are for the output converter 52 and are similar to the respective curves 145 and 146 of Fig. 5. However, the curves 159 and 160 represent operation of the output converter 52 according to the preferred contact timing of the present invention which is such that the output converter contact overlap embraces the input converter contact overlap at all times, even though the latter may vary widely as shown by the curves of Fig. 6.

The curves 161, 162 and 163 are curves of filter input voltage, similar to the curves 149, 153 and 157 of Fig. 5, but representative of the filter input voltage for the given, constant preamplifier input voltage E and for the output converter contact timing of Fig. 6. The curves 164, 165 and 166 are curves showing the preamplifier output voltages corresponding to the voltages of the curves 161, 162 and 163, respectively.

From the curves of Fig. 6, it can be seen that because of the use of an output converter contact overlap which at all times embraces the input converter contact overlap, the preamplifier output voltage appearing between the terminals 37 and 38 has a constant value of V despite variations in the input converter contact overlap. Such variations, therefore, do not cause the introduction of measuring errors in the use of the apparatus.

The conditions illustrated by the curves of Figs. 5 and 6 are typical of actual operating conditions observed. It may be noted, however, that the contact overlap of the output converter can be made to embrace that of the input converter even though the overlap time of the latter may vary in different ways from those illustrated in Figs. 5 and 6. Although in practice the wave form of the filter input voltage may depart somewhat from the rectangular form shown in Figs. 5 and 6, this will in no way affect the compensative action of the output converter just described.

It may be noted that in practice the preamplifier output voltage curves, such as the curves 164, 165 and 166 of Fig. 6 may not be straight lines, but may exhibit a slight A. C. ripple component due to the fact that the filter 54 may not be a perfect filter. However, this will in no way affect the operation of the system as previously described with reference to the idealized curves shown.

The amplifier 49 of Fig. 2 may take any of a number of suitable forms. By way of example, the amplifier 49 may be a two stage voltage amplifier of the type shown in detail in Fig. 7. In this figure, the amplifier 49 is seen to comprise first and second stage amplifying pentode electron tubes 167 and 168, respectively. These tubes may be of the type 6SJ7, each tube including a plate, a suppressor grid, a screen grid, a control grid, a cathode, and a cathode heater. The cathode heaters of the tubes 167 and 168 are energized by a cathode heater battery 169, to the terminals of which the cathode heaters are connected in parallel by means of the partially shown conductors X and Y.

Figure 7:
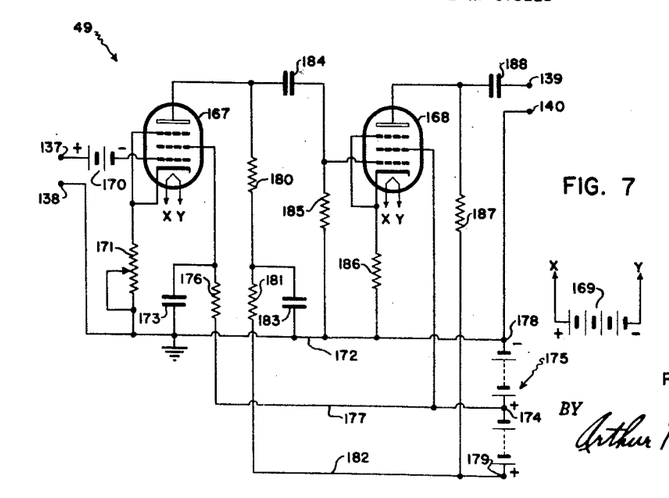
Fig. 7 is a circuit diagram which illustrates the circuit of the amplifier of Fig. 2.

The input terminal 137 of the amplifier 49 is connected to the positive terminal of a grid-bias battery 170, the negative terminal of which is connected to the control grid of the tube 167. The suppressor grid and cathode of the latter are connected together and through a variable cathode bias resistor 171 to a grounded conductor 172. The screen grid of the tube 167 is connected to ground through a by-pass condenser 173, and is connected to a positive terminal 174 of a plate voltage battery 175 through a screen grid resistor 176 and a conductor 177. The input terminal 138, as well as the negative terminal 178 of the battery 175, is connected to ground.

The plate of the tube 167 is connected to a second positive terminal 179 of the battery 175, which terminal is positive with respect to the terminal 174, through a plate load resistor 180 and a decoupling resistor 181, connected in series, and a conductor 182. A decoupling condenser 183 is connected between the junction of the resistors 180 and 181 and ground.

The plate of the tube 167 is also connected to the control grid of the tube 168 through a coupling condenser 184. The last mentioned control grid is also connected to ground through a grid resistor 185. The suppressor grid and the cathode of the tube 168 are connected together and are connected to ground through a cathode bias resistor 186. The screen grid of the tube 168 is connected through the conductor 177 to the battery terminal 174.

The plate of the tube 168 is connected through a plate load resistor 187 and the conductor 182 to the battery terminal 179. This plate is also connected to the amplifier output terminal 139 through a coupling condenser 188. The output terminal 140 is connected to ground.

As will be apparent to those skilled in the art, the amplifier 49 shown in Fig. 7 is a two stage resistance-coupled voltage amplifier employing degenerative or inverse feedback obtained by the use of unby-passed cathode bias resistors. Such an amplifier is well adapted to amplify the minute alternating current signals impressed on the input terminals 137 and 138 by the circuits of Figs. 1 and 2. Since the operation of such an amplifier is well known to those skilled in the art, no explanation of such operation is necessary herein. It is to be noted that the batteries 169 and 175 of Fig. 7 may be replaced with suitable energizing circuits utilizing rectified and filtered alternating currents, if desired.

By way of illustration, the values for the various components of the amplifier 49 may be as follows:

Battery 169, 6 volts
Battery 170, 2 volts
Battery 175, 225 volts (tapped at 180 volts)
Condenser 173, 50.0 microfarads
Condenser 183, 4.0 microfarads
Condenser 184, 0.25 microfarads
Condenser 188, 0.5 microfarads
Resistor 171, 500 ohms (variable)
Resistor 176, 10,000 ohms
Resistor 180, 5,000 ohms
Resistor 181, 25,000 ohms
Resistor 185, 250,000 ohms
Resistor 186, 500 ohms
Resistor 187, 25,000 ohms The use of components having the above stated values will produce an amplifier well adapted to the amplification of signals of small magnitude having frequencies of the order of sixty cycles per second.

The filter circuit 54 of Fig. 2 may be of any type suitable for converting the pulsating direct voltage output of the output converter 52, such as the voltage represented by the curve 163 of Fig. 6, into a pure, ripple-free direct voltage, such as that represented by the curve 166. The details of such a suitable filter circuit are illustrated by way of example in Fig. 8, wherein the filter 54 is seen to comprise condensers 189, 190, and 191, and resistors 192, 193 and 194.

Figure 8:
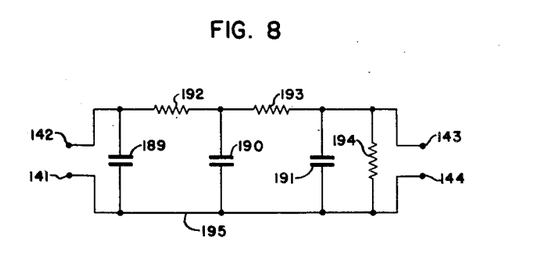
Fig. 8 is a circuit diagram which illustrates the circuit of the filter of Fig. 2.

In the filter 54, the input terminal 142 is connected through the resistors 192 and 193 in series to the output terminal 143. The input terminal 141 is directly connected by a conductor 195 to the output terminal 144. The condenser 189 is connected between the terminals 141 and 142, and the condenser 190 is connected between the junction of the resistors 192 and 193, and the conductor 195. The condenser 191 is connected between the terminals 143 and 144, and the resistor 194 is connected in parallel with the condenser 191.

The method by which the filter circuit 54 operates to remove the alternating voltage ripple component from the pulsating direct voltage applied between the input terminals 141 and 142 and to deliver between the output terminals 143 and 144 a substantially ripple-free, direct voltage is well known to those skilled in the art, and need not be described herein.

By way of example, the following values for the components of the filter circuit 54 have been found suitable for use when the pulsating voltage to be filtered pulsates at a rate of 120 times per second:

Condenser 189, 500 microfarads
Condenser 190, 500 microfarads
Condenser 191, 500 microfarads
Resistor 192, 30 ohms
Resistor 193, 30 ohms
Resistor 194, 40 ohms The amplifier and motor drive circuit of Fig. 1 may take any of a number of suitable forms well known to those skilled in the art. By way of illustration, however, the amplifier and motor drive circuit 4 is shown in Fig. 9 as being of the type disclosed and claimed in the first mentioned Wills patent and disclosed in the second mentioned Wills patent.

Figure 9:
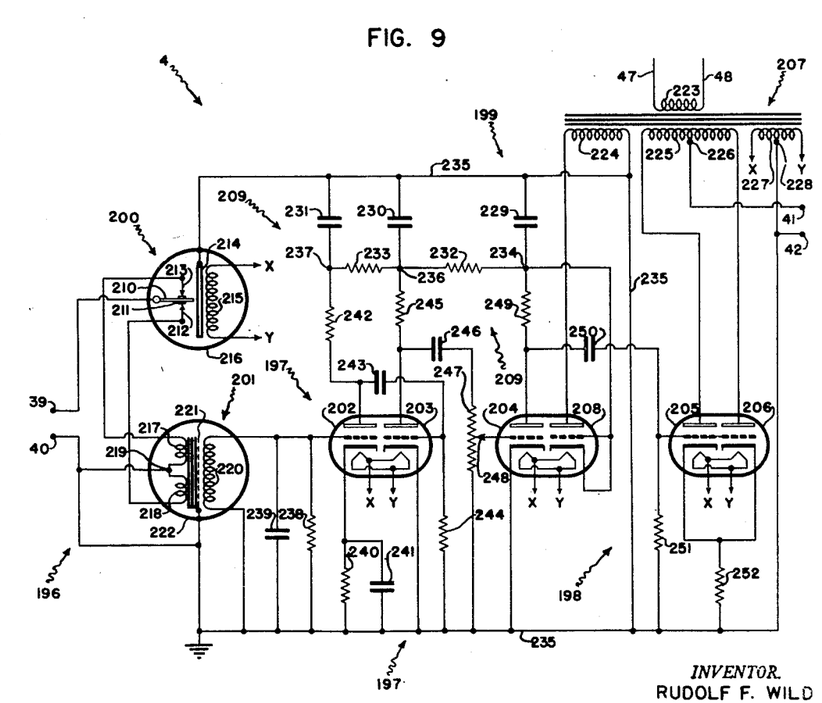
Fig. 9 is a circuit diagram which illustrates the circuit of another portion of the apparatus of Fig. 1.

The circuit of Fig. 9 comprises a converter section 196, an amplifying section 197, a motor drive section 198, and a plate voltage supply section 199. The converter section 196 comprises a converter 200 and an input transformer 201. The amplifying section 197 comprises triode electron tubes 202, 203 and 204, and various other components to be described hereinafter. The motor drive section 198 comprises triode electron tubes 205 and 206, and various other components to be described hereinafter. The plate voltage supply section 199 comprises a power transformer 207, a rectifying electron tube 208, and a filter circuit 209.

The converter 200 is of the same type as the previously described converters 51 and 52 of Figs. 2, 3 and 4 and comprises a reed 210 carrying a contact 211, stationary contacts 212 and 213, a permanent magnet 214, a coil 215, and a shield can 216. The input transformer is of the same type as the previously described transformer 50 of Fig. 2 and comprises primary winding sections 217 and 218, joined together at 219, a secondary winding 220, a shield 221, and a shield can 222.

The triodes 202 and 203 are shown as being sections of a twin triode electron tube such as the type 7F7, each triode comprising a plate, a control grid, a cathode, and a cathode heater. The triode 204 and the rectifier 208 are also shown as being sections of a twin triode electron tube such as the type 7F7, each section comprising a plate, a control grid, a cathode, and a cathode heater. Likewise, the motor drive triodes 205 and 206 are shown as being sections of a twin triode tube such as the type 7N7, each triode comprising a plate, a control grid, a cathode and a cathode heater.

The power transformer 207 comprises a line voltage primary winding 223, a plate supply secondary winding 224, a motor drive secondary winding 225, center-tapped at 226, and a cathode heater secondary winding 227, center-tapped at 228. The primary winding 223 is connected between the branch supply conductors 47 and 48, through which the circuit 4 receives energizing voltage. The cathode heaters of the tubes 202, 203, 204, 205, 206 and 208, as well as the converter coil 215, are connected in parallel across the winding 227 by means of partially shown conductors X and Y, through which the cathode heaters and the coil 215 receive energizing voltage.

The filter circuit 209 comprises filter condensers 229, 230 and 231, and filter resistors 232 and 233. One end of the power transformer secondary winding 224 is connected to the plate of the rectifier 208, and the cathode and control grid of the latter are connected together and to a positive filter input terminal 234. The negative filter input terminal is a grounded conductor 235 to which is connected the remaining end of the secondary winding 224.

The filter resistor 232 is connected between the terminal 234 and a positive filter output terminal 236. The filter resistor 233 is connected between the terminal 236 and a second positive filter output terminal 237. The filter condensers 229, 230 and 231 are connected between the respective terminals 234, 236 and 237 and ground.

The amplifier input terminal 39 is connected to the converter reed 210, and the converter contacts 212 and 213 are connected, respectively, to the unconnected ends of the input transformer primary winding sections 218 and 217. The terminal 219, connecting the remaining ends of the winding sections 218 and 217, is connected to the input terminal 40 and to ground. Also connected to ground are the converter magnet 214 and shield 216, and the input transformer shields 221 and 222.

One end of the input transformer secondary winding 220 is connected to the control grid of the triode 202 and is also connected through a grid resistor 238 to ground. An input condenser 239 is connected in parallel with the resistor 238, and the remaining end of the winding 220 is connected to ground.

The cathode of the triode 202 is connected to ground through a cathode bias resistor 240 in parallel with which is connected a by-pass condenser 241. The plate of the triode 202 is connected through a plate load resistor 242 to the positive filter terminal 237, and is also connected through a coupling condenser 243 to the control grid of the triode 203. The latter is also connected to ground through a grid resistor 244.

The cathode of the triode 203 is connected directly to ground. The plate of the triode 203 is connected through a plate load resistor 245 to the positive filter terminal 236, and is also connected through a coupling condenser 246 to one end of a variable resistor 247. The other end of the resistor 247 is connected to ground, and a sliding contact 248 is engagement with the resistor 247 is connected to the control grid of the triode 204.

The cathode of the triode 204 is connected directly to ground. The plate of the triode 204 is connected through a plate load resistor 249 to the positive filter terminal 234, and is connected through a coupling condenser 250 to the control grids of the triodes 205 and 206. These control grids are also connected to ground through a grid resistor 251. The cathodes of the triodes 205 and 206 are connected to ground through a cathode bias resistor 252.

The plate of the triode 205 is connected to one end terminal of the power transformer secondary winding 225, and the other end terminal of this winding is connected to the plate of the triode 206. The center-tap 226 of the winding 225 is connected to the motor drive circuit output terminal 41, which in turn is connected to one end terminal of the motor control winding 35, as shown in Fig. 1. The motor drive circuit output terminal 42, to which is connected the other end terminal of the motor control winding 35 of Fig. 1, is connected in Fig. 9 to the grounded conductor 235. Thus the motor control winding 235 is connected between the center-tap 226 and ground. The center-tap 228 of the power transformer cathode heater winding 227 is connected to ground in the conventional manner.

In a manner described in detail in the first mentioned Wills patent, the circuit of Fig. 9 is operative to convert in the portion 196 the direct potentials appearing between the terminals 39 and 40 as a result of system unbalance into alternating current signals, which signals are amplified in the portion 197 and applied to the control grids of the motor drive triodes 205 and 206. These signals cause the motor drive circuit 198 to produce motor driving voltages between the terminals 41 and 42 of such nature as to effect rebalancing of the system. For purposes of explanation it may be assumed that an unbalance voltage applied between the terminals 39 and 40 resulting from a temperature decrease of the thermocouple 2 produces a motor drive voltage between the terminals 41 and 42 which is in phase with the supply voltage of the supply conductors 45 and 46, whereas an unbalance voltage resulting from a temperature increase of the thermocouple 2 produces a motor drive voltage which is 180° out of phase with the supply voltage.

With reference to Fig. 1, the condenser 44, connected in series with the motor power winding 34, is of such a value as to form with the winding 34 a series circuit which is resonant at the frequency of the supply voltage of the conductors 45 and 46. Therefore, the power winding current is in phase with the supply voltage and lags by 90° the voltage across the power winding.

The condenser 43, connected in parallel with the motor control winding 35, is of such a value as to form with the winding 35 a parallel circuit which is resonant at the supply voltage frequency. Therefore, the control winding current lags by 90° the voltage impressed on the control winding by the amplifier and motor drive circuit 4.

From what has just been stated it is evident that when the circuit 4 applies a voltage across the control winding 35 which is in phase with the supply voltage, as occurs due to a temperature decrease of the thermocouple 2, the control winding current lags by 90° the power winding current. These two currents produce a rotating magnetic field in the motor 5 which causes rotation of the rotor 36 in a direction to drive the sliding contact 7 downscale to a position to effect rebalancing of the system. Similarly, when the control winding 35 is supplied with voltage which is 180° out of phase with the supply voltage, as occurs due to a temperature increase of the thermocouple 2, the control winding current leads by 90° the power winding current. These two currents then produce a rotating magnetic field which causes rotation of the rotor 36 in an opposite direction to that just specified, and which again drives the sliding contact 7 to a position to effect rebalancing of the system.

While, in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In apparatus for amplifying minute voltages, the combination of an electronic amplifier having an input circuit and having an output circuit and adapted to amplify minute alternating current signals, a converting device including an electrical contacting device of the vibrating reed type and having an output circuit electrically connected to said input circuit and having an input circuit adapted to have a minute direct current signal applied thereto, said contacting device having contacts electrically connected in the input circuit of said converting device and having driving means for operating said contacts between an engaged position and a disengaged position to modify at a predetermined frequency current flow in the input circuit of said converting device, said contacts being maintained in one of said positions during periods the lengths of which tend to vary in a random manner, a transformer included in said converting device connected between said contacts and said amplifier input circuit and operative in conjunction with said contacting device to produce in the input circuit of said amplifier for amplification therein an alternating current signal derived from the direct current signal, said contacts being operative to interrupt the alternating current signal in said amplifier input circuit when in said one of said positions, and a rectifying device including an electrical contacting device and having an input circuit electrically connected to said amplifier output circuit and adapted to have applied thereto an amplified alternating current signal which is the amplified resultant of the alternating current signal in said amplifier input circuit, said rectifying device also having an output circuit in which there appears an amplified direct current signal which is derived from the amplified alternating current signal, the last mentioned contacting device having contacts electrically connected in the output circuit of said rectifying device and having driving means for operating the last mentioned contacts between an engaged position and a disengaged position at said predetermined frequency, said last mentioned contacts being operative to interrupt the amplified direct current signal in the output circuit of said rectifying means when in one of the last mentioned two positions and being constructed and arranged so as to be in said one of said last mentioned two positions during periods of substantially constant length occurring at all times when the first mentioned contacts are in said one of the first mentioned two positions.

2. In apparatus for amplifying minute voltages, the combination of an electronic amplifier having a pair of input terminals and having a pair of output terminals and adapted to amplify minute voltages, an electrical contacting device of the vibrating reed type having a movable contact and two relatively stationary contacts electrically connected in an input circuit including said input terminals, said contacting device including driving means for operating said movable contact at a predetermined frequency from one position in which it engages both of said stationary contacts to another position in which it engages only one of said stationary contacts, said movable contact when in said another position being adapted to apply a minute voltage to said input terminals from said input circuit and when in said one position being adapted to interrupt the application of voltage to said input terminals, said movable contact being maintained in said one position during periods the lengths of which tend to vary in a random manner, and a second electrical contacting device having a movable contact and two relatively stationary contacts electrically connected in an output circuit including said output terminals and a second pair of output terminals, said second contacting device including driving means for operating the last mentioned movable contact at said predetermined frequency from a first position in which it engages both of the last mentioned stationary contacts to a second position in which it engages only one of said last mentioned stationary contacts, said last mentioned movable contact when in said second position being adapted to apply to said second pair of output terminals an amplified voltage which is derived from the minute voltage in said input circuit and when in said first position being adapted to interrupt the application of voltage to said second pair of output terminals, the contacts of said second contacting device being constructed and arranged so that said last mentioned movable contact is in said first position during recurring periods of substantially constant length occurring at all times when the first mentioned movable contact is in said one position.

3. In apparatus for amplifying minute voltages, the combination of an electronic amplifier having an input circuit and an output circuit, a pair of input terminals adapted to have applied therebetween a minute unidirectional voltage to be amplified, an input transformer connected in said input circuit and having a secondary winding and a center-tapped primary winding, a movable contact electrically connected to one of said input terminals, relatively stationary contacts electrically connected to the end terminals of said primary winding, said movable and relatively stationary contacts constituting portions of a contacting device of the vibrating reed type, an electrical connection between the center-tap of said primary winding and the other of said input terminals, driving means for moving said movable contact at a predetermined frequency between a position in which it engages one of said stationary contacts and a position in which it engages the other of said stationary contacts, whereby a minute alternating current voltage derived from the minute unidirectional voltage is applied to said amplifier for amplification thereby, said movable contact in its motion engaging simultaneously both of said stationary contacts throughout periods the lengths of which tend to vary in a random manner, the application of the minute alternating current voltage to said amplifier being interrupted throughout said periods of varying length, a pair of output terminals connected in said output circuit, and a rectifying device connected in said output circuit and including a second electrical contacting device electrically connected in said output circuit and operated at said predetermined frequency, whereby a pulsating unidirectional voltage derived from the amplified minute alternating current voltage is applied to said output terminals, said second contacting device having a plurality of operating positions and being so constructed and arranged as to be in a predetermined one of said operating positions throughout periods of substantially constant length which completely embrace all of said periods of varying length and during which the application of said pulsating unidirectional voltage to said output terminals is interrupted.

4. Apparatus as specified in claim 3 in which said rectifying device comprises an output transformer connected in said output circuit and having a primary winding and a center-tapped secondary winding, in which said second contacting device comprises a movable contact electrically connected to one of said output terminals and relatively stationary contacts electrically connected to the end terminals of the secondary winding of said output transformer, the other of said output terminals being electrically connected to the center-tap of the last mentioned secondary winding, and in which the last mentioned movable contact is constructed and arranged to be in engagement with both of the last mentioned stationary contacts simultaneously throughout said periods of substantially constant length.

5. Apparatus for amplifying minute voltages comprising an interrupting device of the vibrating reed type having relatively movable contacts operative at a predetermined frequency to interrupt periodically a minute voltage to be amplified, the periods during which said contacts effect interruption having lengths which tend to vary in a random manner, whereby the amplified voltage produced by the apparatus tends to vary as a function of the varying length of said periods, an electronic amplifier having an input circuit connected to said interrupting device and having an output circuit, and a second interrupting device having relatively movable contacts connected in said output circuit and operative to interrupt therein at said predetermined frequency the voltage amplified by said amplifier, the last mentioned contacts being so constructed and arranged that the periods during which said last mentioned contacts effect interruption are of substantially constant length and completely embrace all of the first mentioned periods of varying length, whereby the amplified voltage produced by the apparatus is not affected by the varying length of said first mentioned periods.

6. Apparatus for amplifying minute voltages comprising an interrupting device of the vibrating reed type having relatively movable contacts operative at a predetermined frequency to interrupt periodically a minute voltage to be amplified, an operating device for said contacts energized with fluctuating current of said predetermined frequency and having a magnitude substantially below that at which said operating device introduces objectionable stray electrical signals into the apparatus, the magnitude of said fluctuating current being such that the lengths of the periods during which said contacts effect interruption tend to vary in a random manner, whereby the amplified voltage produced by the apparatus tends to vary as a function of the varying length of said periods, an electronic amplifier having an input circuit connected to said interrupting device and having an output circuit, and a second interrupting device having relatively movable contacts connected in said output circuit and operative to interrupt therein at said predetermined frequency the voltage amplified by said amplifier, the last mentioned contacts being so constructed and arranged that the periods during which said last mentioned contacts effect interruption are of substantially constant length and completely embrace all of the first mentioned periods of varying length, whereby the amplified voltage produced by the apparatus is not affected by the varying length of said first mentioned periods.

7. Apparatus for amplifying minute voltages comprising input and output portions and an electronic amplifier electrically connected between said portions, said input portion including a pair of input terminals adapted to have applied therebetween a minute voltage to be amplified by the apparatus, an electrical interrupting device of the vibrating reed type included in said input portion and having contacts electrically connected in circuit with said input terminals and said amplifier, a driving device for operating said contacts through successive operating cycles at a predetermined frequency, each of said operating cycles including periods throughout which said contacts cooperate to apply to said amplifier a voltage derived from the minute voltage applied to said input terminals and including other periods which alternate with the first mentioned periods and throughout which said contacts cooperate to interrupt the application of voltage to said amplifier, said other periods having lengths which tend to vary in a random manner, whereby the voltage applied to said amplifier is interrupted in a random manner, an output circuit included in said output portion and in which the amplified resultant of the voltage applied to said amplifier appears, and a second electrical interrupting device included in said output circuit and having contacts electrically connected in circuit with said output circuit and said amplifier, a driving device for operating the last mentioned contacts through successive operating cycles at said predetermined frequency, each of the last mentioned operating cycles including periods throughout which said last mentioned contacts cooperate to apply to said output circuit the voltage amplified by said amplifier and including other periods throughout which said last mentioned contacts cooperate to interrupt the application of voltage to said output circuit, said last mentioned contacts being so constructed and arranged that the last mentioned other periods are of substantially constant length and completely embrace all of the first mentioned other periods of variable length, whereby the output voltage of said output portion is unaffected by the varying lengths of said first mentioned other periods.

8. Apparatus for amplifying minute voltages comprising a pair of input terminals adapted to have applied therebetween a minute voltage to be amplified, an electrical interrupting device of the vibrating reed type having a movable contact electrically connected to one of said input terminals and having a pair of relatively stationary contacts, an electronic amplifier having an input portion and an output portion, an input transformer having a secondary winding connected to said input portion and having a center-tapped primary winding, a connection between the center-tap of said primary winding and the other of said input terminals, connections between the ends of said primary winding and said stationary contacts, a driving device for moving said movable contact through successive operating cycles at a predetermined frequency, each of said operating cycles including periods throughout which said movable contact engages one or the other of said stationary contacts to apply to said amplifier an alternating voltage of said predetermined frequency derived from the voltage applied to said input terminals, each of said operating cycles also including other periods which alternate with the first mentioned periods and throughout which said movable contact engages both of said stationary contacts simultaneously to interrupt the application of voltage to said amplifier, said other periods having lengths which tend to vary in a random manner, whereby the amplified voltage produced by the apparatus tends to vary as a function of the varying length of said other periods, an output circuit including a pair of output terminals between which the amplified voltage produced by the apparatus appears, a second electrical interrupting device having a movable contact electrically connected to said output circuit and having a pair of relatively stationary contacts connected to the output portion of said amplifier, and a second driving device for moving the last mentioned movable contact through successive operating cycles at said predetermined frequency, each of the last mentioned operating cycles including periods throughout which said last mentioned movable contact engages one or the other of the last mentioned stationary contacts to apply to said output circuit the voltage amplified by said amplifier, each of said last mentioned operating cycles also including other periods which alternate with the last mentioned periods and throughout which said last mentioned movable contact engages both of said last mentioned stationary contacts simultaneously to interrupt the application of voltage to said output circuit, said second driving device and said last mentioned movable and stationary contacts being so constructed and arranged that the last mentioned other periods are of substantially constant length and completely embrace all of the first mentioned other periods of variable length, whereby the amplified voltage produced between said output terminals is unaffected by the varying length of said first mentioned other periods.

9. Apparatus as specified in claim 8, in which the first mentioned interrupting device includes a reed which is maintained in a vibratory state by the first mentioned driving device and which carries the first mentioned movable contact between positions of engagement and disengagement with the first mentioned stationary contacts, said first mentioned driving device including an electromagnet having an operating winding which is energized with fluctuating current of said predetermined frequency to vibrate said reed, said fluctuating current having a magnitude substantially below that at which said operating winding introduces objectionable stray electrical signals into the apparatus, whereby the extent of random variation in the lengths of said first mentioned other periods is of such a magnitude as to tend to render the apparatus unstable in its amplification of minute voltages, said second interrupting device also being a vibrating reed device having a reed which is maintained in a vibratory state by said second driving device and which carries said last mentioned movable contact between positions of engagement and disengagement with said last mentioned stationary contacts, said second driving device including an electromagnet having an operating winding which is energized with fluctuating current of said predetermined frequency to vibrate the last mentioned reed, the last mentioned fluctuating current having a magnitude sufficiently large to maintain constant the lengths of said last mentioned other periods.

10. Apparatus as specified in claim 8, in which said output circuit includes a filter circuit having an input portion and an output portion, electrical connections between said filter circuit input portion, said last mentioned movable contact, and said amplifier output portion, and electrical connections between said filter circuit output portion and said output terminals, whereby the amplified voltage produced by the apparatus between said output terminals is substantially free from any ripple components of said predetermined frequency or its harmonics.

11. Apparatus as specified in claim 8, wherein the minute voltage to be amplified is of the order of one microvolt and in which the first mentioned interrupting device includes a reed which is maintained in a vibratory state by the first mentioned driving device and which carries the first mentioned movable contact between positions of engagement and disengagement with the first mentioned stationary contacts, said first mentioned driving device including an electromagnet having an operating winding which is energized with alternating current of said predetermined frequency to vibrate said reed, said alternating current having a potential of the order of three volts R. M. S. which is substantially below that at which said operating winding introduces objectionable stray electrical signals into the apparatus, whereby the extent of random variation in the lengths of said first mentioned other periods is of such a magnitude as to tend to render the apparatus unstable in its amplification of minute voltages, said second interrupting device also being a vibrating reed device having a reed which is maintained in a vibratory state by said second driving device and which carries said last mentioned movable contact between positions of engagement and disengagement with said last mentioned stationary contacts, said second driving device including an electromagnet having an operating winding which is energized with alternating current of said predetermined frequency to vibrate the last mentioned reed, the last mentioned alternating current having a potential of the order of six volts R. M. S. which is sufficiently large to maintain constant the lengths of said last mentioned other periods.

12. Apparatus for amplifying minute voltages comprising a pair of input terminals adapted to have applied therebetween a minute voltage to be amplified, an electrical interrupting device of the vibrating reed type having a movable contact electrically connected to one of said input terminals and having a pair of relatively stationary contacts, an electronic amplifier having an input portion and an output portion, an input transformer having a secondary winding connected to said input portion and having a center-tapped primary winding, a connection between the center-tap of said primary winding and the other of said input terminals, connections between the ends of said primary winding and said stationary contacts, a driving device for moving said movable contact through successive operating cycles at a predetermined frequency, each of said operating cycles including periods throughout which said movable contact engages one or the other of said stationary contacts to apply to said amplifier an alternating voltage of said predetermined frequency derived from the voltage applied to said input terminals, each of said operating cycles also including periods of contact overlap which alternate with the first mentioned periods and throughout which said movable contact engages both of said stationary contacts simultaneously to interrupt the application of voltage to said amplifier, said periods of contact overlap having lengths which tend to vary in a random manner, whereby the amplified voltage produced by the apparatus tends to vary as a function of the varying length of said contact overlap periods, an output circuit including a pair of output terminals between which the amplified voltage produced by the apparatus appears, an output transformer having a primary winding connected to the output portion of said amplifier and having a center-tapped secondary winding, a second electrical interrupting device having a movable contact electrically connected to said output circuit and having a pair of relatively stationary contacts connected to the ends of the last mentioned secondary winding, a connection between the center-tap of said last mentioned secondary winding and said output circuit, and a second driving device for moving the last mentioned movable contact through successive operating cycles at said predetermined frequency, each of the last mentioned operating cycles including periods throughout which said last mentioned movable contact engages one or the other of the last mentioned stationary contacts to apply to said output circuit the voltage amplified by said amplifier, each of said last mentioned operating cycles also including periods of contact overlap which alternate with the last mentioned periods and throughout which said last mentioned movable contact engages both of said last mentioned stationary contacts simultaneously to interrupt the application of voltage to said output circuit, said second driving device and said last mentioned movable and stationary contacts being so constructed and arranged that the last mentioned contact overlap periods are of substantially constant length and completely embrace all of the first mentioned contact overlap periods of variable length, whereby the amplified voltage produced between said output terminals is unaffected by the varying length of said first mentioned contact overlap periods.

13. In measuring apparatus, a normally balanced network adapted to be connected to a source of minute unidirectional voltage which varies in value in accordance with changes in a variable condition and thereby unbalances said network, a preamplifying device having an output circuit and having an input circuit connected to said network, said network being operative to impress on said input circuit a minute unidirectional unbalance voltage of a polarity and magnitude respectively dependent on the direction and extent of unbalance of said network, said preamplifying device including an electronic amplifier and an electrical contacting device of the vibrating reed type connected between said input circuit and said amplifier, said contacting device having contacts electrically connected in said input circuit and having driving means for operating said contacts between an engaged position and a disengaged position at a predetermined frequency, said contacts being maintained in one of said positions during periods the lengths of which tend to vary in a random manner and being operative when in said one of said positions to interrupt the application to said amplifier of a minute alternating current voltage derived from the unidirectional unbalance voltage, a filter circuit included in said output circuit and having input and output portions, a second contacting device included in said output circuit having contacts electrically connected in said output circuit and having driving means for operating the last mentioned contacts between an engaged position and a disengaged position at said predetermined frequency, said last mentioned contacts being operative when in one of the last mentioned two positions to interrupt the application to the input of said filter of an amplified alternating current voltage derived from the minute alternating current voltage applied to said amplifier, said last mentioned contacts being constructed and arranged so as to be in said one of said last mentioned two positions during recurring periods of substantially constant length occurring at all times when the first mentioned contacts are in said one of the first mentioned two positions, whereby there appears in the output of said filter a substantially unidirectional amplified potential representative of the minute unidirectional unbalance potential impressed on said input circuit, and a rebalancing device having an input circuit to which is applied the amplified unidirectional potential and operative to rebalance said network in response to the polarity and magnitude of the amplified unidirectional potential.

RUDOLF F. WILD.

REFERENCES CITED

The following references are of record in the file of this patent:

UNITED STATES PATENTS

| Number | Name | Date |
| --- | --- | --- |
| 1,378,712 | Milnor | May 17, 1921 |
| 2,297,543 | Eberhardt et al. | Sept. 29, 1942 |
| 2,367,349 | Harrison | Jan. 16, 1945 |
| 2,413,788 | Sargeant et al. | Jan. 7, 1947 |